US012424042B2

(12) United States Patent
Hartman et al.

(10) Patent No.: US 12,424,042 B2
(45) Date of Patent: Sep. 23, 2025

(54) MULTI-FACTOR AUTHENTICATION DOOR ACCESS CONTROL SYSTEM

(71) Applicant: ASSA ABLOY Global Solutions AB, Stockholm (SE)

(72) Inventors: Keith W. Hartman, Redwood City, CA (US); Dan Potter, Monterey, CA (US); Sunny Wang, Saratoga, CA (US); Stephen Daniel Connor, Valley Center, CA (US)

(73) Assignee: ASSA ABLOY Global Solutions AB, Stockholm (SE)

( * ) Notice: Subject to any disclaimer, the term of this patent is extended or adjusted under 35 U.S.C. 154(b) by 80 days.

(21) Appl. No.: 18/114,862

(22) Filed: Feb. 27, 2023

(65) Prior Publication Data

US 2023/0360457 A1 Nov. 9, 2023

Related U.S. Application Data

(60) Provisional application No. 63/314,337, filed on Feb. 25, 2022.

(51) Int. Cl.

| | |
|---|---|
| ***G07C 9/25*** | (2020.01) |
| ***G07C 9/00*** | (2020.01) |
| ***G07C 9/28*** | (2020.01) |

(52) U.S. Cl.
CPC ........... *G07C 9/25* (2020.01); *G07C 9/00309* (2013.01); *G07C 9/00563* (2013.01); *G07C 9/28* (2020.01); *G07C 2009/00793* (2013.01); *G07C 2209/64* (2013.01)

(58) Field of Classification Search
CPC .. G07C 9/25; G07C 9/00309; G07C 9/00563; G07C 9/28; G07C 2209/64
See application file for complete search history.

(56) References Cited

U.S. PATENT DOCUMENTS

| | | | | |
|---|---|---|---|---|
| 2018/0218200 | A1* | 8/2018 | Wolf | G06V 40/45 |
| 2019/0172281 | A1* | 6/2019 | Einberg | G06F 3/013 |
| 2020/0342245 | A1* | 10/2020 | Lubin | G06V 40/70 |
| 2023/0377370 | A1* | 11/2023 | Haller | G06V 10/993 |

* cited by examiner

*Primary Examiner* — Vernal U Brown
(74) *Attorney, Agent, or Firm* — Schwegman Lundberg & Woessner, P.A.

(57) ABSTRACT

A multi-factor authentication access control system is described for permitting access to secured locations. Types of authentication factors include property or physical-based items and biometric-based information. Optionally, the biometric information presented by the person is evaluated for being a presentation attack. Exemplary embodiments are directed to controlling door access.

18 Claims, 9 Drawing Sheets

MULTI-FACTOR AUTHENTICATION DOOR ACCESS CONTROL SYSTEM

CROSS-REFERENCE TO RELATED APPLICATIONS

This claims priority to provisional application No. 63/314,337, filed Feb. 25, 2022, entitled "MULTI-FACTOR AUTHENTICATION DOOR ACCESS CONTROL SYSTEM" incorporated herein by reference in its entirety for all purposes.

BACKGROUND OF THE INVENTION

1. Field of the Invention

This invention relates to door access control systems, and particularly, to door access control systems for permitting access based on two or more authentication factors.

2. Description of the Related Art

Conventional door access control systems frequently require only one authentication factor. For example, a property-based authentication item such as an electronic access key is all that is necessary to enter a hotel room. The access key is assigned to a particular room for a confirmed guest at registration. To enter the room, the guest must present the card to the electronic reader at the guest's door. The reader detects the authorized credential and sends it to a secured door lock control panel. If the credential is the correct number assigned to the room, the secured control panel sends a signal to an electromagnetic lock to open the door.

A problem with such one factor authentication access control systems is that any individual that obtains the access key may open the door assigned to that key if the person knows which door the key has been assigned.

A more secure access control system is therefore desired.

SUMMARY OF THE INVENTION

An access control system comprises at least one door; an electro-mechanical device for permitting access through the at least one door; and a reading device located adjacent to the door or, optionally, embedded in the door.

In embodiments, the reading device includes at least one camera and processor framework. The processor framework is operable to perform several operations including but not limited to: detect the subject approaching the door, determine a level of intent to open the door, and determine a level of confidence the approaching subject is a match with an authorized individual based on evaluating multiple different types of authentication factors. In embodiments, authentication factors are (a) biometric or physiological-based; (b) physical or property-based; or (c) memory or knowledge-based.

In embodiments, and if the subject is a match, the reading device is operable to transmit the subject's credential to a secured door access control device (e.g., secured control panel). The door access control panel is operable to unlock the lock on the door if the credential is authorized or allowable.

In embodiments, the reading device is further operable to compute a presentation attack detection (PAD) score for whether the individual is a real person, and use the score for authenticating the subject or prohibiting access.

In embodiments, a non-transitory program storage device, readable by a processor and comprising instructions stored thereon, is operable to cause one or more processors to: acquire a sequence of images of a scene in a vicinity of an access reading device; determine a level of intent the subject presents to the access control device; and determine a level of confidence the approaching subject is a match with an authorized individual based on evaluating multiple authentication factors.

In embodiments, the instructions stored thereon further cause the one or more processors to: determine the level of intent based on proximity to the access reading device or based on motion of the individual. In embodiments, proximity of the individual to the access reading device is based on short-range, wireless communication such as UWB or Bluetooth.

In embodiments, the instructions stored thereon further cause the one or more processors to: compute a presentation attack detection (PAD) score for whether the individual is a real person, and use the score for authenticating the subject or prohibiting access.

In embodiments, the instructions stored thereon further cause the one or more processors to: send a signal to an access control device or the lock itself to unlock the door.

In embodiments, the instructions stored thereon further cause the one or more processors to: determine the level of confidence based on biometric information arising from the face of the approaching person and an authorized biometric template previously stored on a physical or property-based item in possession of the approaching subject.

Methods for permitting access based on the user's intent, and multiple different authenticating factors are also described.

The description, objects and advantages of embodiments of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein is an access control system and related methods.

Access Control Overview

Figure 1:
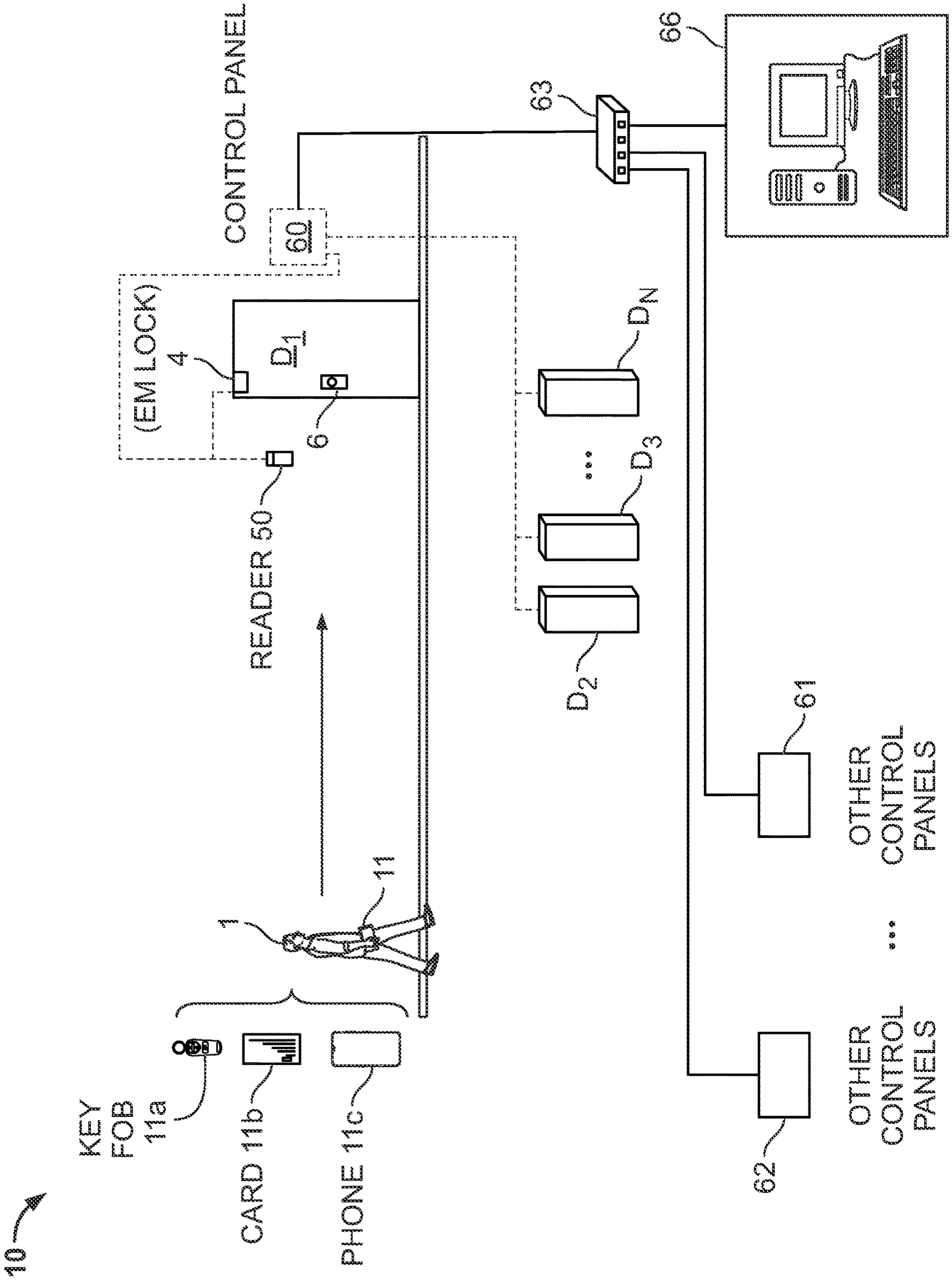
FIG. 1 is an illustration of a multi-factor authentication door access control system in accordance with an embodiment of the invention.

FIG. 1 is an illustration of a multi-factor authentication door access control system 10 in accordance with an embodiment of the invention for unlocking a door D1 as an individual 1 approaches the door. The individual is shown with a portable programmable computing device (PCD) 11 in their possession. As discussed herein, the PCD holds authenticating information for the individual used by the system to grant or prohibit access. Examples of PCDs include without limitation key fobs 11*a*, access cards 11*b*, and smartphones or tablets 11*c*.

The system 10 is also shown having an electromechanical locking device 4, door handle 6, a biometric multi-factor authentication reader 50 mounted on the wall adjacent the door, and a door control panel 60 in a secured location (e.g., embedded in the wall). The system 10, and particularly, the control panel 60 is shown in communication with a plurality of doors D1, D2, D3, . . . DN, each of which can have a corresponding electromechanical lock and a reader. A host computer 66 is shown for transmitting information (e.g., enrolled subject data and credentials) to the control panel 60, and optionally the reader device 50. Allowed credentials for doors D1, D2, D3, . . . DN can be added to a database in the system via the host computer and uploaded to the control panel by operators.

The embodiment shown in FIG. 1 also includes other control panels 61, 62 in communication with host computer 66 via a switch or hub 63. Each control panel 60, 61, 62, etc. can be operable to control a unique set of doors, each of which can have a corresponding reader and lock. The system is operable to control access to multiple doors using two factor authentication as described herein.

Figure 2:
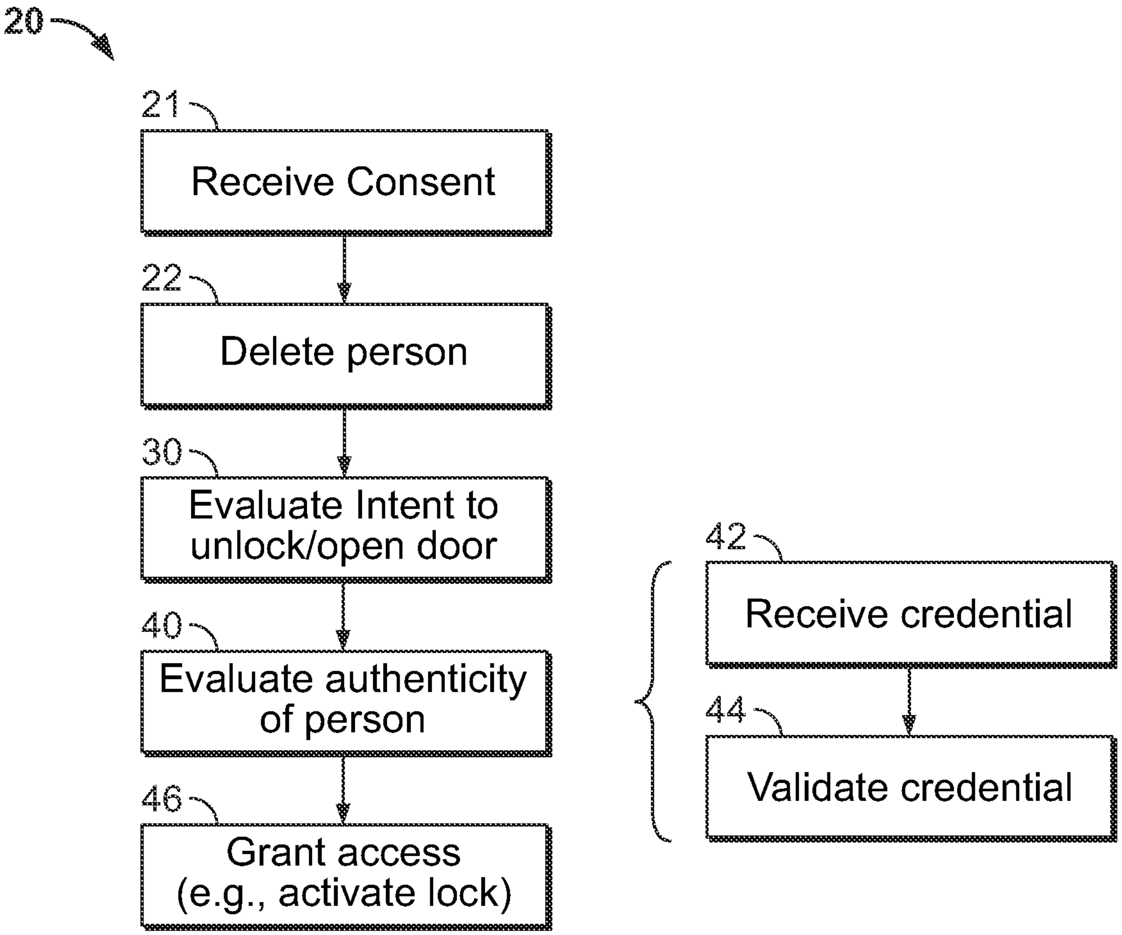
FIG. 2 is a flow chart of a door access control process in accordance with an embodiment of the invention.
Figure 3A:
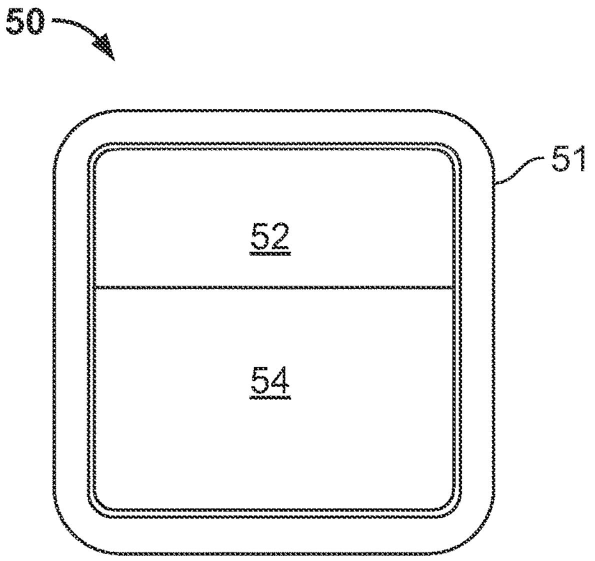
FIGS. 3A-3D illustrate a front, side, rear and perspective view, respectively, of an access control biometric-based authenticating reading device in accordance with an embodiment of the invention.
Figure 3B:
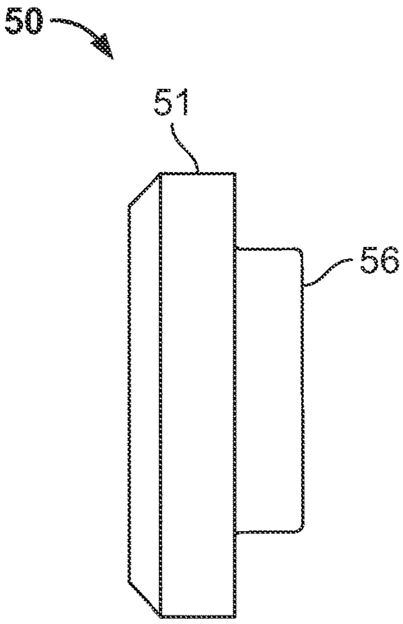
Figure 3C:
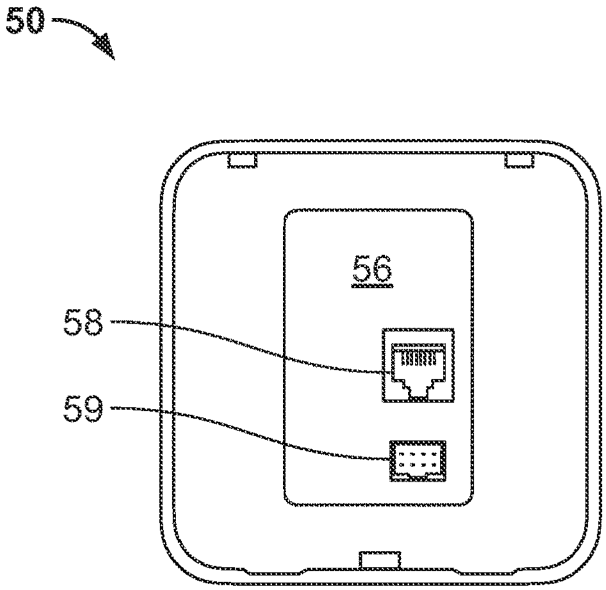
Figure 3D:
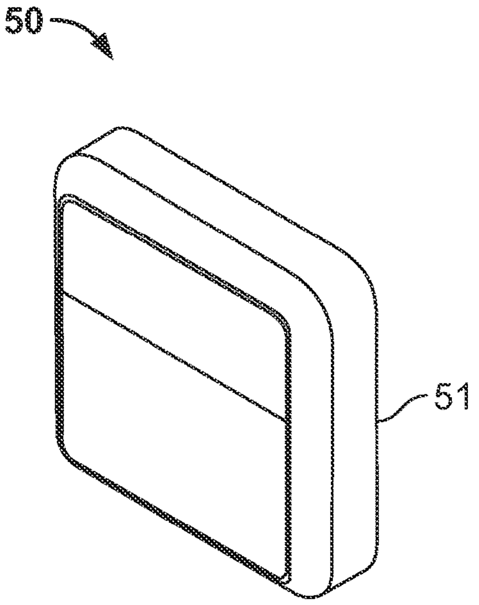

With reference to FIG. 2, an overview of a multi-factor authentication door access control process 20 is illustrated in accordance with an embodiment of the invention. To facilitate understanding of the process 20, and the performance of exemplary steps of the process, reference is also made to the components and functionality shown in FIGS. 1, 3 and 4.

Step 21 states receive consent. In embodiments of the invention, the process initially queries for whether consent by the individual is provided to transmit (pull or scan as the case may be) personal information from the subject's PCD. Types of information may include biometric, location, habits, and/or other information stored on their PCD. This step may be carried out by the reader 50 prompting the individual to provide consent. In other embodiments, the PCD can be programmed to automatically share the information with the reader device 50 based on location if, when the individual enrolls in the system, the individual provides consent at the time of enrollment.

Step 22 states detect person. This step can be carried out by detecting the presence of a person in the vicinity of the door. In embodiments, this step is carried out by analyzing on processor 80 in the reader 50 the sequence of images from cameras 72, 74. A face detecting module can be employed to detect one or more persons and/or faces in the vicinity of the door. An example of a face detecting module is described in U.S. Pat. No. 11,176,357, entitled "FAST FACE IMAGE CAPTURE SYSTEM", filed Oct. 30, 2019, (hereinafter referred to as "the '357 Patent") incorporated herein by reference in its entirety.

If a person is detected, the process proceeds to step 30. Step 30 states to evaluate intent to unlock/open door. This step can be carried out by tracking the person's motion or proximity to the door. In embodiments, a level of intent is computed on the processor 80 of the reader based on analyzing the sequence of images generated by the cameras 72, 74. An example of an intent detecting module is described in U.S. application Ser. No. 17/368,778, entitled "DOOR ACCESS CONTROL SYSTEM BASED ON USER INTENT", filed Jul. 6, 2021, (hereinafter referred to as "the '778 Application") incorporated herein by reference in its entirety.

If a sufficient level of intent is computed by the processor 80, the method proceeds to step 40. Step 40 states to evaluate authenticity of the person, and particularly, to receive credential and validate credential corresponding to steps 42, 44, respectively.

As described further herein, a credential is presented by the individual either (passively or otherwise) to the reader device 50. The credential, embodied by a physical item or property on the possession of the person (e.g., a PCD), is a first factor of authentication. Examples of physical devices 11 for storing credentials include, without limitation, key fobs 11*a*, access cards 11*b*, electronic tokens, tags, PCDs and smart phones 11*c*. As stated herein, the credential is a unique number or identify assigned to an approved or enrolled person when the person is registered. For example, in the case that a person joins a company, the company may verify the person's name by SSN and birth certificate. The company then assigns the new employee a unique ID number, a credential number if different than the ID number, take a face photo or other biometric-type image, and record other information about the person which information is all verified at the time of hire. The employee information can then be enrolled or stored in a secure company database for use by the control access system as described herein.

Step 44 states to validate the credential and may be carried out by the reader device 50. In embodiments, and as described further herein, the reader device 50 validates the credential by a second factor of authentication. Preferably, the second factor of authentication is biometric based. Examples of biometric based authentication include face, fingerprint, and iris matching. In preferred embodiments, the second factor of authentication is based on face matching between the person presenting at the door and stored information of the enrolled or authorized person(s).

Optionally, as discussed further herein, the method can include presentation attack detection (PAD). PAD provides further security that the person presenting to the reader is indeed a real person (and not another wearing a mask or presenting a photo of the person). Techniques and systems for PAD which may be incorporated into the present invention and the reading device 50 are described in Provisional Application No. 63/177,714, entitled "THERMAL BASED PRESENTATION ATTACK DETECTION FOR BIOMETRIC SYSTEMS", filed Apr. 21, 2021; incorporated herein by reference in its entirety for all purposes.

Step 46 states grant access. As described above in Step 44, information of the person presenting at the door is compared to that of an authorized person for a sufficient match. An example of a face matching module is described in the above listed '778 Application and '357 Patent, both of which are incorporated herein by reference in their entirety.

If a match is determined between the person presenting at the door and an enrollee, access is granted and the lock of the door is activated to be unlocked.

It is to be understood however, that the above method 20 is intended as merely one embodiment of the invention and that the invention may vary widely and include different, additional or less steps. Additionally, the order of the steps may be rearranged. The invention is only intended to be limited as recited in any appended claims.

FIGS. 3A-3D depict an enlarged front view, side view, rear view and perspective view, respectively, of the biometric authentication reading device 50 shown in FIG. 1. The reading device 50 is shown comprising a main housing or body 51, upper window 52 and lower window 54. As described further herein, in embodiments, optical window 52 and radio-frequency transparent panel 54 are made of a material such as glass (52) or ABS plastic (54), respectively, and allow for transmission of electromagnetic radio waves therethrough.

Upper region 52 is sized to accommodate several cameras, discussed herein.

Lower region 54 is sized to read an access card according to, for example, Open Supervised Device Protocol (OSDP), Wiegand, and UWB technologies.

The reading device 50 also includes a rear housing or shell 56 which is shown supporting an ethernet port 58 and power interface port 59.

Optionally, the reader device may include programmable lights (e.g., LEDs) located behind or adjacent the windows to alert the user of various operations. Operations can include, e.g., a green light for access granted, red light for access denied, and yellow light for error.

Figure 4:
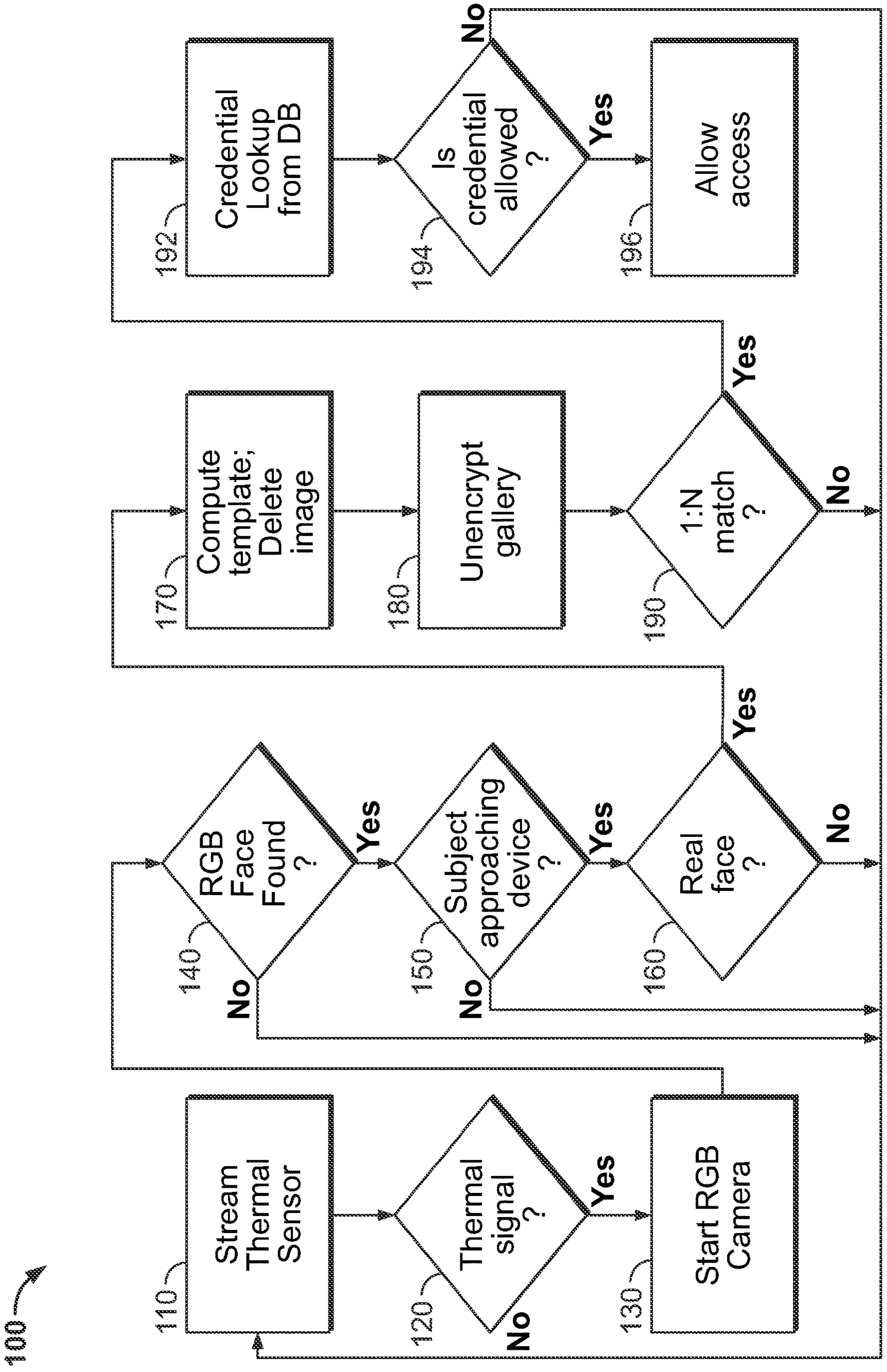
FIG. 4 is a flow chart illustrating a biometric-based authentication access control process in accordance with an embodiment of the invention

FIG. 4 Single-factor biometric-based enrollment process 100

Figure 5:
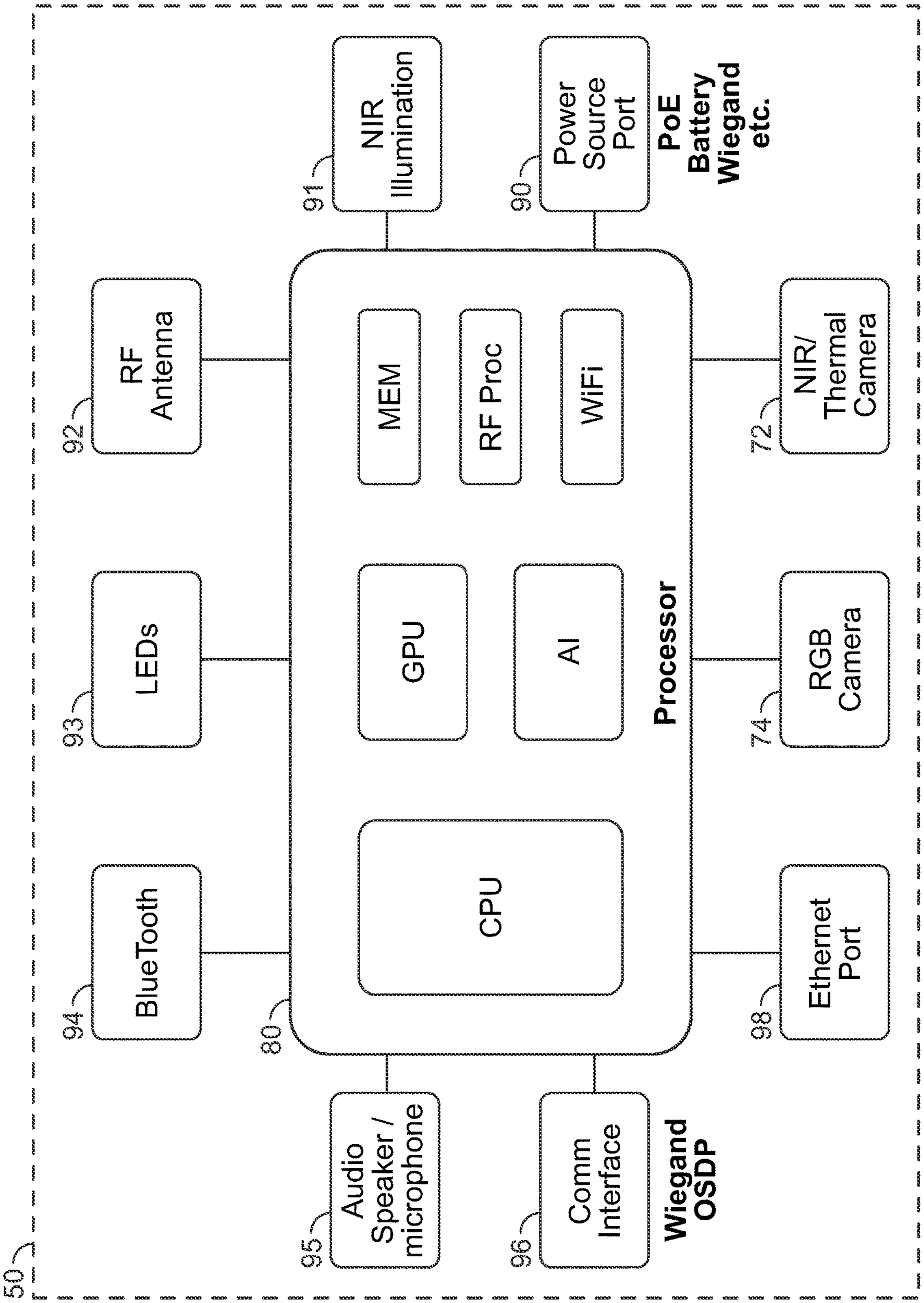
FIG. 5 is a block diagram of an access control biometric-based authenticating reading device in accordance with an embodiment of the invention.

With reference to FIG. 4, an access control process 100 is illustrated for providing access to a secured area. In a preferred embodiment, providing access comprises opening or unlocking a door such as the door D1 shown in FIG. 1. To facilitate understanding of the process 100, and the performance of exemplary steps of the process, reference is also made to the components and functionality included in the system block diagram 50 shown in FIG. 5.

Step 110 states to stream thermal sensor. In a preferred embodiment, a thermal sensor 72 is located in the reading device 50 and configured or operable to streams images and to detect the presence of an individual in the field of view. An example of an all-in-one thermal type sensor is the MLX90640 Far Infrared Thermal Sensor, manufactured by Melexis. (Ypres, Belgium).

Step 120 states thermal signal. Step 120 queries whether a thermal signal is received by the thermal sensor 72. If a thermal signal is received, it is assumed that an individual is present in the field of view and the process proceeds to the next step.

In other embodiments, and in lieu of an all-in-one type thermal sensor, the reader comprises a thermal camera and the thermal camera sends thermal images to the processor 80. The processor board or framework 80 is operable to analyze the thermal images for the presence of an individual based on, e.g., an object detection classifier. Examples of hardware which may be included on the processor framework or board 80 are, without limitation, CPU processor, GPU processor, AI processor (e.g., a TPU), memory, RF processor, and optionally various image and graphics processing units.

Step 130 states to start the RGB camera. This step may be performed by a RGB camera on the reading device 50. If an individual is detected based on the thermal sensor, the RGB camera commences streaming images to the processor 80. Examples of RGB cameras, include without limitation, Leopard Imaging CMOS camera, model number LI-USB30-AR023ZWDRB (Fremont, California). The computer (or on-board image signal processor) may also control or automate exposure settings to optimize the amount of light exposed to the camera sensor. Examples of sensors include, without limitation, the IMX501 image sensor manufactured by Sony Corporation (Tokyo, Japan). Additionally, the sensors and cameras may comprise their own image processing software.

Step 140 states face found. Step 140 searches for a face. A detection, tracking, and recognition engine or module on the reading device 50 searches for faces and optionally other objects as the candidate walks towards the access control device or door. Face(s) are detected and tracked across the sequence of images. A wide range of face and object detection and tracking algorithms may be employed on the reading device 50 by the processor 80. Non-limiting examples of suitable face and object detection and tracking algorithms include: King, D. E. (2009). "Dlib-ml: A Machine Learning Toolkit" (PDF). J. Mach. Learn. Res. 10 (July): 1755-1758. CiteSeerX 10.1.1.156.3584 (the "dlib face detector"); and the JunshengFu/tracking-with-Extended-Kalman-Filter. The dlib face detector is stated to employ a Histogram of Oriented Gradients (HOG) feature combined with a linear classifier, an image pyramid, and sliding window detection scheme. See also the dib above listed '778 Application and '357 Patent.

Step 150 states subject approaching the device. Step 150 is one embodiment of the invention for intention detection where subject's intention to open the door is assumed if they are moving towards the door. Images of the subject may be analyzed for whether they are approaching the door by, for example, if the subject (or a feature of the subject) is getting larger in each image of a sequence of images. Examples of features to track include, without limitation, face size, head size, body size, and head angle (e.g., yaw pitch and roll). This step may be performed by the reading device 50. Data from an on-board depth sensor may also be obtained and used or fed into the intention classifier. Examples of intention classifiers are described in the '778 App. Examples of depth sensors include brand RealSense Depth Camera D435i or L515, manufactured by Intel Corporation (Santa Clara, California).

If the level of intent is deemed adequate, the method proceeds to step 160. Step 160 queries whether the face is real, and not a presentation attack. In embodiments, presentation attack detection (PAD) is performed using the reading device 50 and based on analyzing features or patterns in the thermal and RGB images of the subject's face. For example, the eyes of a real face should have an elevated temperature compared to other regions of the face. Techniques and systems for PAD which may be incorporated into the present invention and the reading device 50 are described in Provisional Application No. 63/177,714, entitled "THERMAL BASED PRESENTATION ATTACK DETECTION FOR BIOMETRIC SYSTEMS", filed Apr. 21, 2021; incorporated herein by reference in its entirety for all purposes. If the face is deemed real, and not a spoof or presentation attack, the method proceeds to step 170.

Step 170 states to compute a template for face recognition. Face recognition is a biometric authenticating factor that the subject is a match with an authorized individual based on evaluating biometric information (namely, the face) of the subject and the authorized individual. This step may be performed by the reader device 50.

In the embodiment shown in FIG. 4, a template or vector is computed of the face of the approaching subject from the live streamed images. The template may include numerous features (e.g., 50-100, or more) corresponding to different landmarks of the face (and the geometrical or the relationships between the landmarks). This information can be stored as a listing or vector. The image(s) of the face are then deleted, serving to protect privacy of the subject. This step may be performed by the reading device 50.

Step 180 states to unencrypt the gallery. This step is performed by unencrypting a gallery of stored templates of enrolled or authorized subjects (e.g., 100-10,000 templates of authorized subjects). If the gallery is not encrypted this step is omitted. However, it is preferred to encrypt the gallery for security and thus step 180 is desired.

Step 190 states 1:N match. This step is performed by screening each template in the gallery for a sufficient match with the approaching subject's template. This step can be performed on one of the processors 80 described above of the reading device 50. After this step is performed, the gallery is encrypted or otherwise returned to its encrypted state on the reading device 50. Maintaining the gallery database in encrypted form is desirable in the event entire reading device 50 is removed from the wall and stolen.

Optionally, the reader device sends the person's template (preferably encrypted template) to a remote server for matching. The server can be operable to rapidly determine whether the difference between the approaching person's template and a stored authorized template from the gallery is acceptable to confirm the person's identity.

The face matching phase may be performed using a face matching engine. Machine learning algorithms and inferencing engines can also be incorporated into the device 50 or a remote server for increasing the accuracy and efficiency of the above described steps, particularly, for increasing the accuracy and efficiency of face detection and matching. Indeed, a wide variety of image matching algorithms may be employed. Exemplary algorithms for image matching include, for example, the Algorithms evaluated by the National Institute of Standards and Technology (NIST) Face Recognition Vendor Test (FRVT) and headquartered in Gaithersburg, Maryland. See, e.g., NIST Internal Report 8280 Natl. Inst. Stand. Technol. Interag. Intern. Rep. 8280, 81 pages (December 2019).

Next, if the level of confidence is deemed adequate for a face match, the method proceeds to step 192 for credential lookup. This step is performed on the reading device 50 by looking up in a database or table the credential (e.g., a 26 or 48 Bit Weigand code, OSDP credential, or proprietary credential format) for the matched subject. Databases of credentials for enrolled subjects may be updated and stored in memory in the reading device.

Next, with reference to step 194, the credential is sent to a lock control panel (e.g., control panel 60 shown in FIG. 1) to unlock the door. The control panel 60 is located in a secured location (e.g., embedded in wall, or a locked room, closet, or cabinet) and stores a set of allowed credentials each of which corresponds to a particular door lock and reading device. In embodiments, each door lock has one corresponding reading device. The control panel evaluates whether the credential is a match to stored credential.

Step 196 states to allow access. In embodiments, if the credential is allowed, the control panel sends a signal to the locking device 4 to unlock the door so that the person 1 may open the door. In some embodiments, the locking device is incorporated directly in the door handle itself 6. Examples of electric door locks that may be incorporated into the handle structure include without limitation the Series 45/44 electric locks manufactured by ZKTeco USA (Fairfield, New Jersey).

Figure 6:
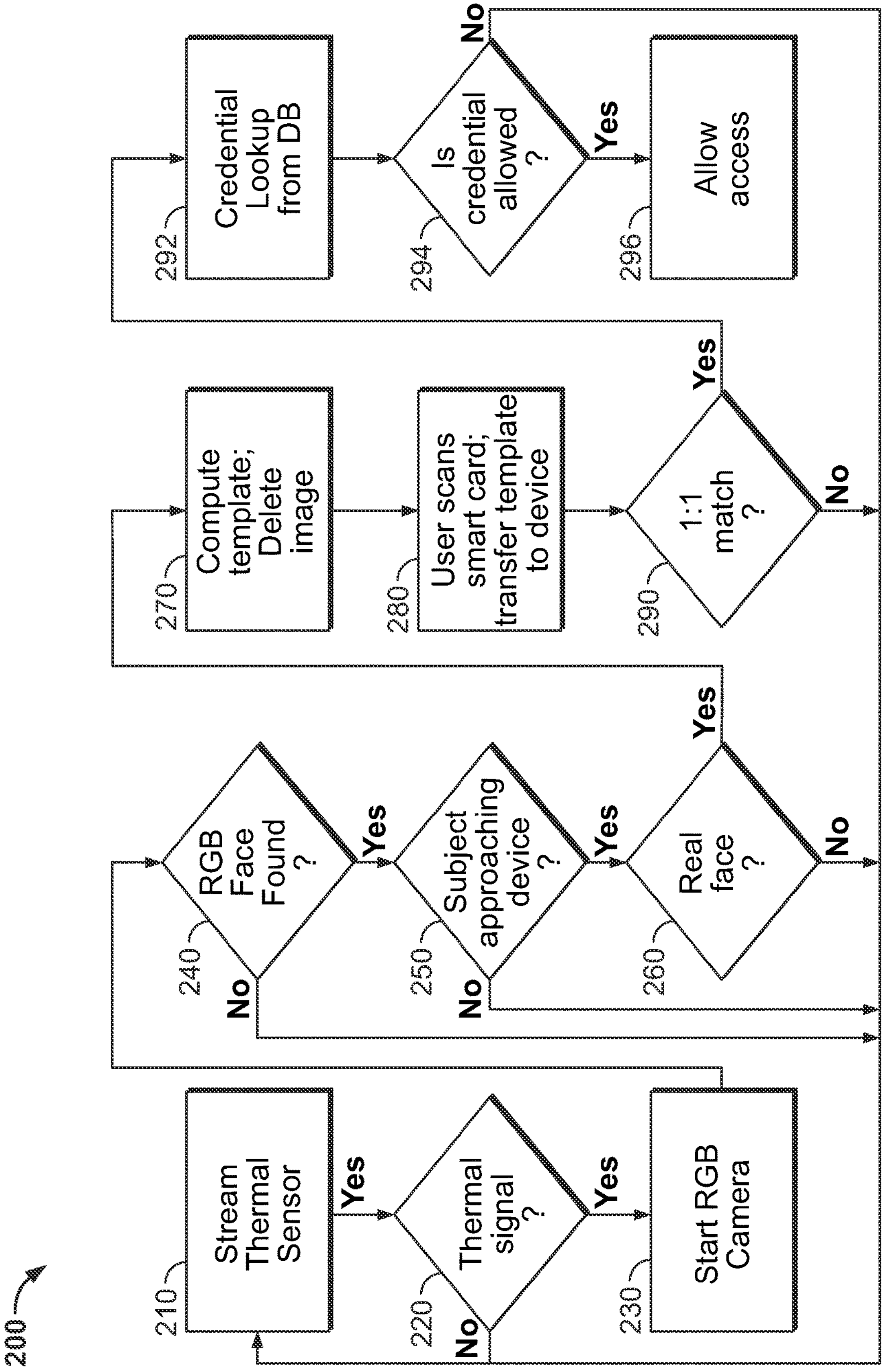
FIG. 6 is a flow chart illustrating a multi-factor authentication access control process based on the subject's face and credential from their smart card in accordance with an embodiment of the invention.

FIG. 6 Multi-Factor Card-Based Enrollment Process 200

With reference to FIG. 6, a card-based enrollment process 200 is illustrated for providing access to a secured area in accordance with another embodiment of the invention.

The enrollment process 200 is generally the same as the enrollment process described above in connection with FIG. 4 except that in step 280 of the enrollment process 200, the individual must present a physical item (namely, a smart card 11*b* of FIG. 1) to the reading device 50 in order to provide the access control system 10 the stored authorized biometric template of the individual (e.g., an approved face template of the subject stored on the smart card).

During Step 280, the individual manipulates their smart card near or against window 54 of the reading device, and the reading device wirelessly obtains the authorized biometric template from the smart card via, e.g., the RF antenna 92 and RF processor. Exemplary technologies for storing and transferring information from the card to the reading device include, without limitation, NFC, Wiegand and OSDP technologies.

The steps subsequent to step 280 of process 200 can proceed similarly to process 100 described above to grant or prohibit access to doors D1, D2, D3, . . . DN.

Notably, the card-based enrollment process 200 has a number of advantages over the process 100 described in FIG. 4. First, process 200 requires two different factors of authentication including (i) a physical item on possession of the individual (namely, the smart card 11*b*) and (ii) a biometric-based match between the computed biometric template of the approaching individual and the existing authorized template. Two-factors of authentication are more secure than one-factor.

Additionally, the biometric template matching step 290 is a 1:1 match and thus faster than the corresponding 1:N step in method 100.

Additionally, no personal data is required to be stored on the reading device 50—the personal data is stored on the user's card. This prevents theft of the user's data and privacy breaches even if the reading device 50 is stolen. To the extent any unencrypted personal information is uploaded to the reader device 50, the processor can be operable to delete the sensitive information after it is temporarily used for matching.

Figure 7:
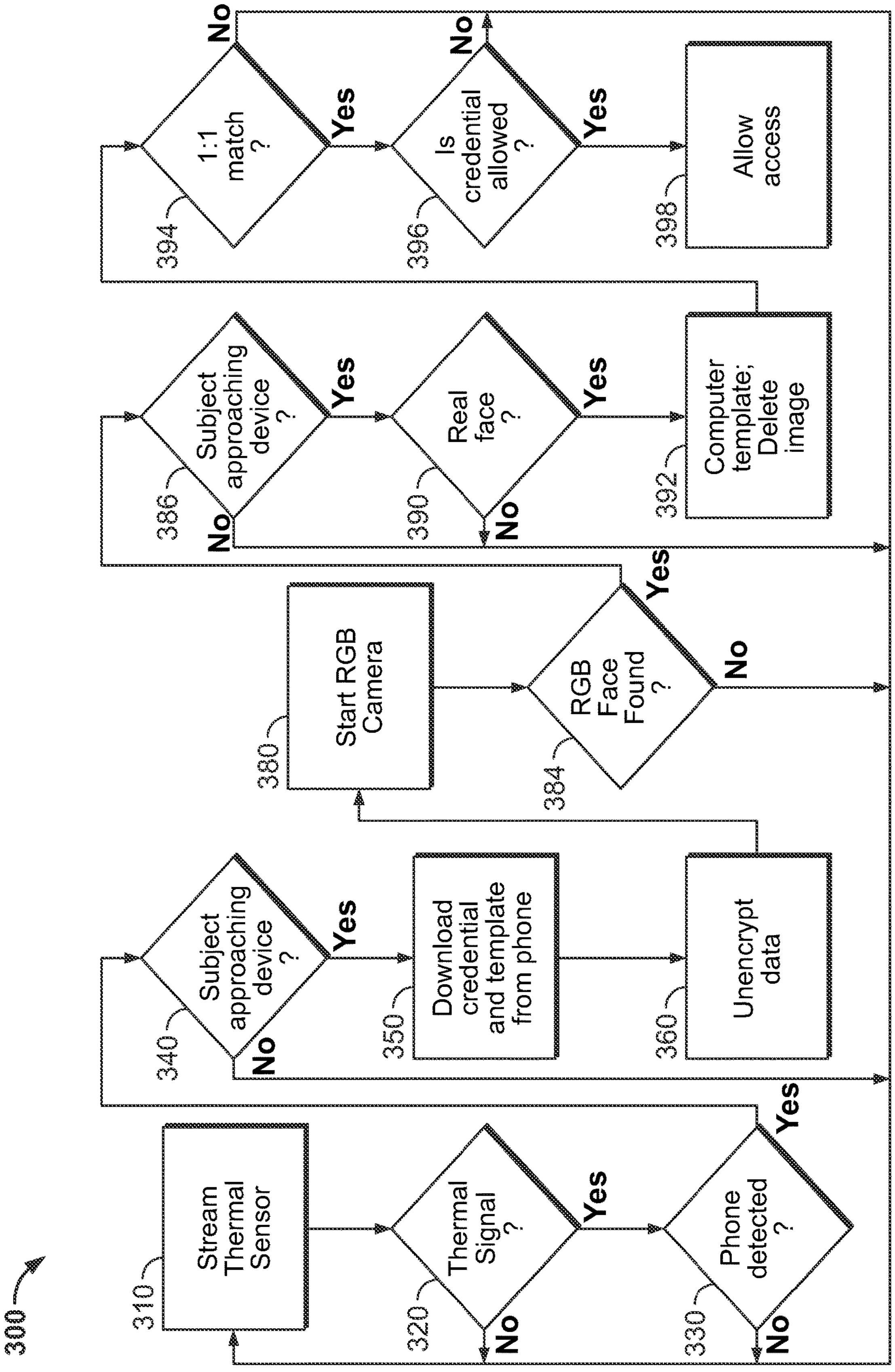
FIG. 7 is a flow chart illustrating another multi-factor authentication access control process based on the subject's face and credential from their smart phone in accordance with an embodiment of the invention.

FIG. 7 Multi-Factor Phone-Based Enrollment Process 300

With reference to FIG. 7, an access control process 300 is illustrated for providing access to a secured area in accordance with another embodiment of the invention.

Initial steps 310, 320, are similar to that described above in connection with FIG. 4, namely, the method streams raw images from a thermal sensor and determines whether there is a thermal signal or trigger when an individual enters the field of view. These steps can be performed by the reading device 50 as described above.

Step 330 states phone detected. In embodiments, this step detects the phone on the possession of an enrolled individual by near field communication (NFC) and in preferred embodiments, by ultra-wide band (UWB) technology. Examples of UWB transceiver modules or systems which are operable with the reading device 50 and processor 80 include the Trimension SR040, manufactured by NXP (Eindhoven, Netherlands). The UWB signal may be received by RF antenna 92 and processed by RF processor on processor board 80.

In this embodiment, the phone (e.g. phone 11*c* of FIG. 1) is UWB-enabled and programmed to be automatically detected by the reader 50 if the person has provided consent to be detected. In embodiments, the phone is programmed with an App that stores the user identity, enrollment credential, biometric templates, and other information that may be useful for the access control systems.

Step 340 states subject approaching the device. Step 340 is one embodiment of the invention for intention detection where intention is assumed if the subject is moving towards the door. UWB technology conveniently provides location information of the individual's phone. Using the UWB information for phone location, the reading device 50 can evaluate whether the individual is approaching the reading device based on the distance between the reading device 50 and phone 11*c*. In embodiments, intention is assumed or confirmed if the distance between the reading device and phone decreases with time and/or the absolute distance is less than a threshold distance such as between 36 to 50 inches.

In embodiments, intention is assumed or confirmed if the measured velocity relative to a door (or another feature such as the door handle) is within a pre-specified range of magnitude and direction such as 0.3-0.5 m/s magnitude and a direction less than 15° relative to the axis defined by the UWB transceiver on the door to the mobile device.

In embodiments, intention is assumed or confirmed if the measured acceleration relative to a door (or another feature such as the door handle) is within a pre-specified range of magnitude and direction such as −0.1 to −0.2 m/s^2 magnitude and a direction less than 15° relative to the axis defined by the UWB transceiver on the door to the mobile device.

In embodiments, intention is assumed or confirmed if the UWB information is combined with optical flow information or other subject position, velocity, and acceleration measurement from an RGB, NIR, thermal IR image or depth imaging stream (for example, as described above in connection with FIG. 2, step 30).

In embodiments, each door device is programmed to determine the various UWB parameters described above in order to compute an intention score. In embodiments, one door may have different UWB parameters compared to another door. For example, the door device near the freight storage may have a UWB threshold distance equal to 12 inches or less whereas the threshold distance for the main entrance may be range from 36 to 48 inches.

In addition to door location, the thresholds could be dynamic as a function of time of day, number of detected people, etc. (for example utilizing priors, preferably Bayesian priors combined to form a joint probability).

In embodiments, a building may have a plurality of door devices, each programmed to have a unique of UWB thresholds relative to each door.

Step 350 states to download credential and template from the phone. When the phone is within a threshold distance, the subject's authorized biometric template and enrollment credential is sent to the reading device 50 via UWB. As described above, a RF antenna 92 and RF processor in the reader is operable to receive and process this information.

Step 360 states to unencrypt data. In embodiments, the data delivered by the phone to the reading device is encrypted. For example, the biometric template is encrypted and the reading device 50 unencrypts the template for face matching, described herein.

Step 380 states to start RGB camera. This step may be performed the same as that described above in connection with methods 100, 200.

Step 384 states face found. This step may be performed the same as that described above in connection with connection methods 100, 200.

Step 386 states subject approaching device. This step may be performed the same as that described above in connection with connection methods 100, 200. This step may also be omitted in view of being somewhat duplicative of the step 340 wherein the intention is determined or evaluated using data from the UWB.

Step 390 states real face. Step 390 queries whether the face is real, and not a presentation attack. This step may be performed the same as that described above in connection with methods 100, 200.

Steps 392, 394 relate to biometric matching. These steps may be performed as described above in connection with process 200 where the authorized biometric template is obtained from the phone instead of the smart card.

Step 396 states credential allowed. Here, the credential was obtained from the phone according to Step 350 described above versus a lookup table as described above in process 200. Regardless of how the credential is obtained by the reader, evaluation of whether credential is allowed can be performed the same as that described above in connection with methods 100, 200. The credential is transmitted via comm interface 96 to a control panel (e.g., door control panel 60 shown in FIG. 1) to unlock the door. Unlike the reader device 50, the control panel 60 is located in a secured location (e.g., embedded in a wall, a locked room, closet, or cabinet) and stores a set of allowed credentials each of which corresponds to a particular door lock and reading device. In embodiments, each door lock has one corresponding reading device. The control panel 60 evaluates whether the credential is a match to a stored authorized credential.

Step 398 states to allow access. As described above, this step is performed by the control panel sending a signal to unlock the locking device if the credential is allowed.

Notably, the phone-based enrollment process 300 has a number of advantages over the process 100 described in FIG. 4. First, process 300 requires two different factors of authentication including (i) a physical item on possession of the individual (namely, the phone 11*c*) and (ii) a biometric-based match between the computed biometric template of the approaching individual and the existing authorized template. Two-factors of authentication are more secure than one-factor.

Additionally, the biometric template matching step 394 is a 1:1 match and thus faster than the corresponding step in method 100.

Additionally, no personal data is required to be stored on the reading device 50—the personal data is stored on the user's phone. This prevents theft of the user's data and privacy breaches even if the reading device 50 is stolen. To the extent any unencrypted personal information is uploaded to the reader device 50, the processor can be operable to delete the sensitive information after it is temporarily used for matching.

Additionally, in the process 300, the reader device does not need to store a credential database because the credential itself is stored on the person's phone along with their authorized biometric template. Thus, the reader device does not carry a lookup table or database to match a person with an approved credential. The credential is conveniently transferred from the phone 11*c*, to the reader 50, to the control panel 60 in process 300.

Figure 8:
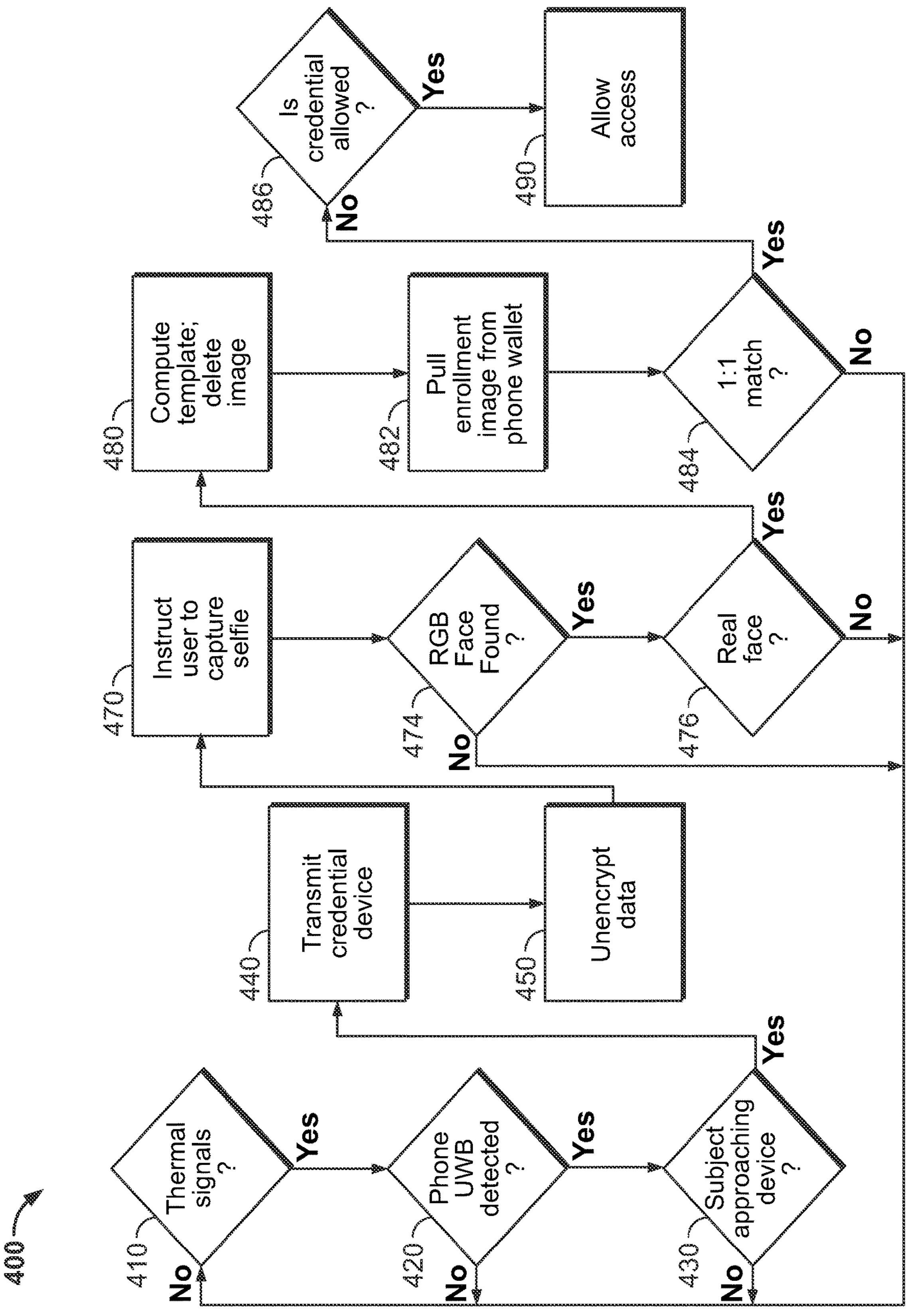
FIG. 8 is a flow chart illustrating another multi-factor authentication access control process based on the subject's face and credential and enrollment image from their smart phone in accordance with an embodiment of the invention.

FIG. 8 Multi-Factor Phone-Based Matching Process 400

With reference to FIG. 8, another access control process 400 is illustrated for providing access to a secured area in accordance with an embodiment of the invention.

Initial steps 410 to 450 are similar to steps 310 to 360 described above in connection with FIG. 7. These steps can be performed by the reading device 50 as described above.

Step 470 states to instruct person to capture a self-portrait (i.e., selfie or photo of their face). This step can be performed by the phone in possession of the person. The phone is programmed to prompt the person to obtain a photo of their face with the phone's camera(s).

Step 474 states face found. This step is performed by the phone which is programmed to detect and locate a face. The face finding algorithm can be similar to that described above in connection with connection methods 100, 200, 300 except it is performed on the phone instead of the reader device. Additionally, face "tracking" is not performed. Tracking is not needed in process 400.

Step 476 states real face. Step 476 queries whether the face is real, and not a presentation attack. This step may be performed by image analysis using only the user's phone. For example, in embodiments, the phone is operable to compute depth, and/or NIR reflectivity based on images of the person's face obtained from the phone's camera(s) and/or depth sensors.

Step 480 states to compute template, namely, compute template of the subject's face based on the selfie from step 470. This step can be performed similar to any of steps 170, 270, 392 described above except the phone—not the reading device—is operable or programmed to compute the biometric template based on the selfie from the phone's camera. Subsequent to use of the computed biometric template from the selfie, the selfie image is deleted.

Step 482 states to pull enrollment image from the phone wallet. This step is carried out by the phone. The phone uses a previously uploaded and authorized image of the person and creates an authorized biometric template. For example, when the subject (or enrollee) enrolls with the enroller, the enrollee provides an image to the enroller. The enroller verifies the image is that of the enrollee with additional authentication information such as birth certificate, SSN, passport, driver's license, utility or bank statements, etc. The verified authorized image is then uploaded to the phone by for example storing the authorized image in the phone's wallet.

Step 484 states 1:1 match. Step 484 may be performed on the phone similar to that performed in methods 200, 300 except that the match is performed on the phone 11*c* instead of the reader 50.

Step 486 states credential allowed. The credential (which was sent to the reader device 50 from the phone 11C in step 440) is transmitted via the comm interface 96 to a door lock control panel (e.g., control panel 60 shown in FIG. 1) to unblock the door. Unlike the reader device 50, the control panel 60 is located in a secured location (e.g., a locked room, closet, or cabinet) and stores a set of authorized credentials each of which corresponds to a particular door lock and reading device. In embodiments, each door lock has one corresponding reading device. The control panel evaluates whether the credential is a match to a stored credential.

Step 490 states allow access. As described above, the control panel sends a signal to unlock the door lock if the credential is allowed.

Notably, the phone-based enrollment process 400 has a number of advantages over the process 100 described in FIG. 4. First, process 400 requires two different factors of authentication including (i) a physical item on possession of the individual (namely, the phone 11*c*) and (ii) a biometric-based match between the computed biometric template of the approaching individual and the existing authorized template. Two-factors of authentication are more secure than one-factor.

Additionally, the biometric template matching step 484 is a 1:1 match and thus faster than the corresponding step in method 100.

Additionally, no personal data is required to be stored on the reading device 50—the personal data is stored on the user's phone. This prevents theft of the user's data and privacy breaches even if the reading device 50 is stolen. To the extent any unencrypted personal information is uploaded to the reader device 50, the processor can be operable to delete the sensitive information after it is temporarily used for matching.

Additionally, in process 400, none of the biometric computations are performed or stored on the unsecure reading device. The biometric computations and matching are all performed on the person's phone.

Multi-Factor Authentication Access Control Phone Application

Figure 9:
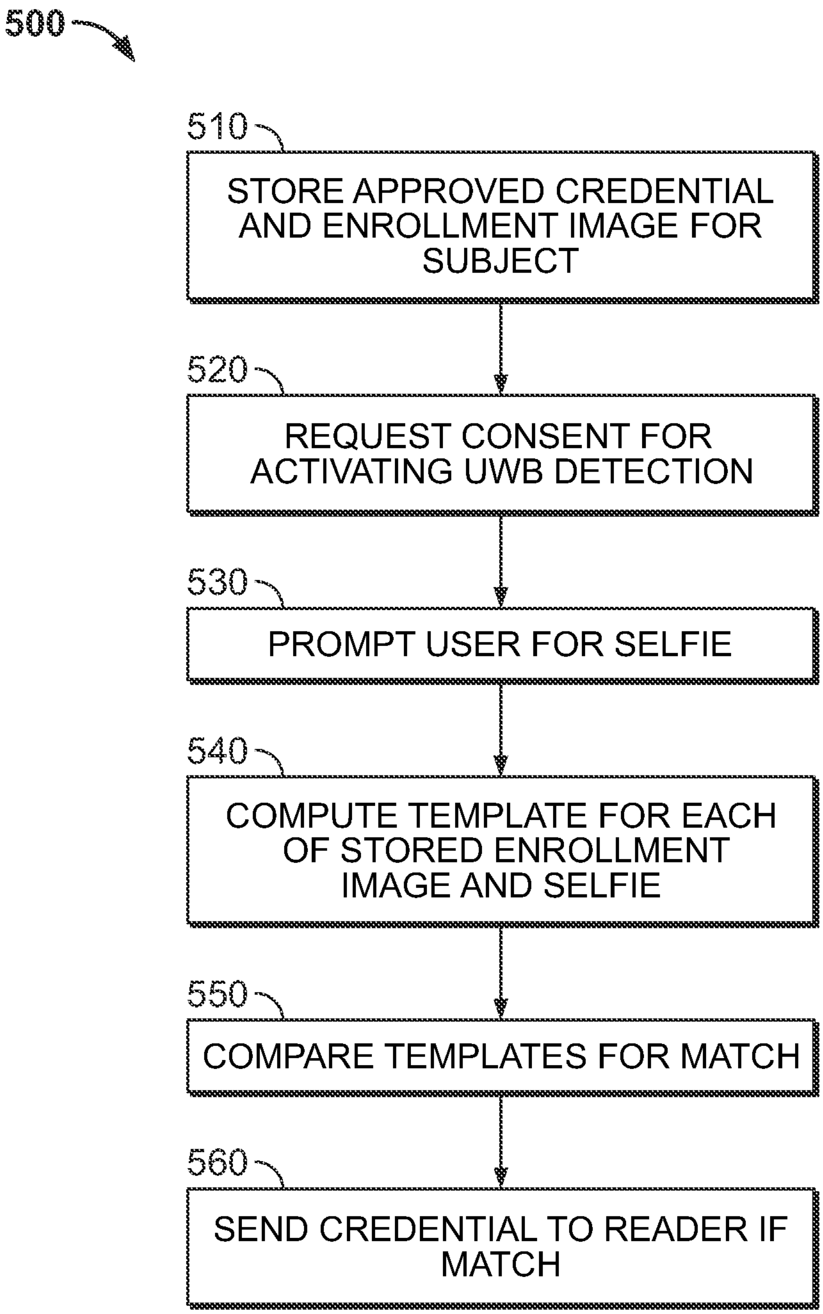
FIG. 9 is a flow chart illustrating a multi-factor authentication access control phone software application in accordance with an embodiment of the invention.

With reference to FIG. 9, a multi-factor authentication access control phone application 500 is illustrated in accordance with embodiments of the invention wherein each of the steps can be performed by the user's programmed phone. The user's phone is programmed by a downloaded App. The App may be run on a smart phone (e.g., phone 11C described in system FIG. 1) and used in performing multi-factor phone-based matching processes (such as process 400, described above).

With reference again to FIG. 9, first Step 510 states to store approved credential and enrollment image for the subject. This step is carried out by opening the App and registering the subject with the enroller. The enroller shall issue an ID number, credential and other information upon satisfactory confirmation of the subject's identification. For example, the enroller may require the subject to take a photo, provide a passport and other identifying information to enroll the subject in its database. Upon approval, the App instructs the phone to store an authorized credential, name, ID, and photo of the subject.

Step 520 states to request consent for activating UWB detection. This step is performed by the phone prompting the user to provide consent and to activate the UWB location and data transfer functionality on the phone. Although this step may be performed one time during registration in step 510, in preferred embodiments, a request to activate UWB is performed each time the subject approaches the reader and door.

Step 530 prompts user for a selfie. This step is performed by the phone alerting the user to take a selfie as the user is approaching the reader 50.

Step 540 states to compute templates for each of the stored enrollment image and the selfie. This step is performed by the phone. Particularly, the App instructs the processor to execute a template computation for each of the stored enrollment image and the fresh selfie. Templates from the images are generated as described above in connection with the other embodiments. After the templates are generated, the selfie image is deleted.

Step 550 states to compare the templates for a match. This step is performed on the phone as described above in connection with method 400.

Step 560 states to send credential to reader if match. This step is performed by the phone via UWB. The phone transmits the credential to the reader 50 if the templates match. The reader 50 can then grant or activate the locks as described above.

Notably, the phone-based enrollment process 500 has a number of advantages over the process 100 described in FIG. 4. First, process 500 requires two different factors of authentication including (i) a physical item on possession of the individual (namely, the phone 11*c*) and (ii) a biometric-based match between the computed biometric template of the approaching individual and the existing authorized template. Two-factors of authentication are more secure than one-factor.

Additionally, the biometric template matching step 550 is a 1:1 match and thus faster than the corresponding step in method 100.

Additionally, no personal data is required to be stored on the reading device 50—the personal data is stored on the user's phone. This prevents theft of the user's data and privacy breaches even if the reading device 50 is stolen. To the extent any unencrypted personal information is uploaded to the reader device 50, the processor can be operable to delete the sensitive information after it is temporarily used for matching.

Additionally, in process 500, none of the biometric computations are performed or stored on the unsecure reading device. The biometric computations and matching are all performed on the person's phone.

In a particular embodiment of the invention, a non-transitory program storage device, readable by a processor and comprising instructions stored thereon causes one or more processors to perform the steps described above and recited in FIG. 9. Additionally, the types of storage devices and processors may vary widely and can include those customarily provided with smart phones, tablets, and PCDs, for example.

Alternative Embodiments

The above described embodiments of the invention may vary widely. For example, in any of the above described methods, steps may be added or removed in any logical manner except where doing so would be exclusive to one another. Additionally, the order of the steps may be varied in any logical manner.

Additionally, in embodiments, a trained authenticating model or engine may be provided to determine an authenticity score that the approaching person is a match with the authorized person. Examples of inputs for the authenticating model include without limitation: the approaching person's motion and/or level of intention to open the door, time of day, day of the week, person's attire, presence of others, biometric match level of confidence, an authenticated physical item or property such as an access card, fob or phone; PAD, associated links to "know your customer" (KYC) background check information, as well knowledge-based authenticating information such as a password. Collectively, the model computes an authenticity score. This authenticity score can be constructed for example, using prior successful authentications as a truth baseline, and put into a joint probability in a Bayesian framework.

In view of the above model, it is possible the score for a person varies with the time of day. For example, a person that lost their physical item carrying the authenticated credential and biometric template, may still receive a sufficient authenticating score if others are present and the time of day and day of the week are during normal business hours because the risk is less. However, in contrast, the same person (and lacking their physical authenticating item) would receive a lower authenticating score in the middle of the night and be prohibited from unlocking the door or otherwise provided access without additional authenticating factors.

Additionally, although the above described embodiments recite particular technologies for performing detection, location, proximity of a physical object relative to the reader device, the invention is not so limited. Other wireless technologies may be employed in the invention for detection, location, and proximity except where excluded from any appended claims.

Additionally, although particular component arrangements of access control systems were described herein, additional components may be added or removed to carry out the invention except where excluded from any appended claims. Additionally, components may be interconnected and communicate with one another in any logical arrangement except where excluded from any appended claims. For example, the host or remote server computers may be arranged to communicate directly with the reader device.

Additionally, components may be combined in embodiments. For example, a reader may include control panel functionality and be programmed to communicate directly with door lock or access control points.

Additionally, the configuration or type of locking device may vary widely. Non limiting examples of lock devices include keyless EM door locks, EM locking plates; electronic door strikes and drop bolts, actuators/motors for automatic sliding door(s); and electronic locks for chests, cabinets, cash registers, safes, and vaults.

Additionally, the type of door or barrier may vary widely. The invention is applicable to a wide variety of barriers including swinging or sliding type doors, as well as turnstile, baffle gate, as well as tollbooth or train crossing type bars. Additionally, in the environments where a controlled opening or ingress lacks a solid barrier, and instead controls access by an alarm or light, the access control device may be mounted adjacent the opening to obtain the images of the person and carry out the computation steps described above. If the assessment(s) are passed, the access control device sends a signal to activate the audio, alarm, or light to permit entry.

Additionally, a reader device may also be operable to allow access to personal, business, or commercial accounts such as financial, security, and/or bank accounts, or digital or on-line accounts for example your medical, university, social media, video game, entertainment accounts. Access to the accounts can include permitting withdrawal, payments, and generally transactions. In embodiments, to permit access, or transfer credit, securities, money, or other types of finances, the reader device would be operable similar to the methods described above except instead of sending the credential to the door control panel, the reader would send the credential to the account manager (e.g., bank, financial institution, third party operator, etc.)

The reader described above may be operable to verify metadata, such as age verification.

Although a number of embodiments have been disclosed above, it is to be understood that other modifications and variations can be made to the disclosed embodiments without departing from the subject invention.

The invention claimed is:

1. A multi-factor authenticating door access control system for evaluating whether a person approaching a door is an authorized person to unlock the door, the system comprising:

- a biometric authenticating reader comprising:
  - a housing;
  - at least one camera; and
  - at least one processor operable to:
    - receive a sequence of images from the at least one camera of a scene in a vicinity of the reader;
    - detect a person approaching the reader;
    - receive a credential from a physical item on the person approaching the reader;
    - receive an approved biometric template of the authorized person from the physical item on the person approaching the reader;
    - determine a computed biometric template of the person approaching the reader based on the sequence of images;
    - determine a level of confidence the person approaching the reader is the authorized person based on comparing the approved biometric template and the computed biometric template;
    - compute a level of PAD based on emitting multiple wavelengths of light towards a face of the person approaching the reader and detecting reflectance/absorption of all of the multiple wavelengths; and
    - prohibit activating a door lock for the door based on the level of PAD.

2. The system of claim 1, wherein the physical item is a key fob, smart phone, or access card.

3. The system of claim 2, further comprising a control panel, wherein the reader sends the credential to the control panel if the level of confidence is greater than a threshold value.

4. The system of claim 3, wherein the control panel evaluates whether the credential is allowed and delivers a signal to the door lock to unlock the door lock if the credential is an allowed credential.

5. The system of claim 1, wherein the processor is further operable to determine a level of intent the person approaching the reader desires to open the door.

6. The system of claim 5, wherein the processor is operable to compute a body motion of a subject within the scene based on the sequence of images and determine the level of intent based on the body motion of the subject.

7. The system of claim 5, wherein determining the level of intent is based on detecting a candidate subject's proximity to the door by an RF-based location tracking technology.

8. The system of claim 7, wherein the RF-based location tracking technology is at least one of Bluetooth, Wi-Fi, or UWB.

9. The system of claim 1, further comprising a thermal sensor, wherein the at least one processor is operable to compute the level of PAD based on images from the thermal sensor.

10. The system of claim 9, wherein detection of the person approaching the reader is based on a signal from the thermal sensor.

11. The system of claim 1, further comprising:

- a remote server; and
- a communication interface adapted to communicate information with the server.

12. The system of claim 1, wherein the at least one processor is operable to delete any personal information (PI) uploaded to the reader after the PI is used for authentication.

13. A multi-factor authenticating door access control method for evaluating whether a person approaching a door is an authorized person to unlock the door, the method comprising:

- detecting a person approaching the door;
- transmitting an approved credential from a phone in possession of the person approaching the door to a reader adjacent the door;
- prompting the person approaching the door to take a self-portrait using the phone;
- determining a computed biometric template of the person approaching the door based on the self-portrait;
- determining an approved biometric template of the authorized person based on an approved photo of the authorized person previously stored on the phone;
- determining a level of confidence the person approaching the door is the authorized person based on comparing the approved biometric template and the computed biometric template; and
- sending a signal to the reader that the person approaching the door matches the authorized person based on the level of confidence.

14. The method of claim 13, further comprising sending the approved credential from the reader to a control panel if the level of confidence is greater than a threshold value.

15. The method of claim 14, wherein the control panel evaluates whether the credential is an allowed credential and delivers a signal to the door lock to open the door lock if the credential is an allowed credential.

16. The method of claim 13, further comprising determining a level of intent the person approaching the door desires to open the door.

17. The method of claim 16, wherein determining the level of intent is based on detecting a candidate subject's proximity to the door by an RF-based location tracking technology, wherein the RF-based location tracking technology is at least one of Bluetooth, Wi-Fi, or UWB.

18. The method of claim 13, further comprising computing a level of PAD of the person approaching the door.

* * * * *